United States Patent [19]

McCurdy

[11] Patent Number: 5,949,516
[45] Date of Patent: Sep. 7, 1999

[54] EYEGLASS LOCATOR SYSTEM

[76] Inventor: Clarence McCurdy, 966 Ilima Ct., Fremont, Calif. 94536

[21] Appl. No.: 09/097,332

[22] Filed: Jun. 15, 1998

[51] Int. Cl.⁶ ..................................................... G02C 1/00
[52] U.S. Cl. .......................................... 351/158; 351/122
[58] Field of Search .................................... 351/158, 122

[56] References Cited

U.S. PATENT DOCUMENTS

| | | | |
|---|---|---|---|
| 3,390,938 | 7/1968 | Gansz | 351/43 |
| 3,853,393 | 12/1974 | Fila | 351/111 |
| 4,086,004 | 4/1978 | Scrivo | 351/158 |
| 5,423,215 | 6/1995 | Frankel | 73/386 |
| 5,606,743 | 2/1997 | Vogt | 455/347 |

*Primary Examiner*—Huy Mai
*Attorney, Agent, or Firm*—Goldstein & Canino

[57] ABSTRACT

An eyeglass locator system for locating misplaced eyeglasses having a frame and a pair of earpieces extending rearwardly from the frame, comprising a transmitter and a receiver portion. The transmitter is preferably keychain attachable, and produces a radio frequency signal when activated by means of a button. The receiver portion is located at the eyeglasses and produces and audible and/or visual alert in response to the radio frequency signal. The receiver portion is preferably either encapsulated within one or both of the earpieces at its distal end, or is located in a sleeve which is mounted over the distal end of one or more of the earpieces of an existing pair of eyeglasses.

10 Claims, 2 Drawing Sheets

EYEGLASS LOCATOR SYSTEM

BACKGROUND OF THE INVENTION

The invention relates to an eyeglass locator system. More particularly, the invention relates to a system for aiding an eyeglass owner in locating their eyeglasses when they are misplaced.

A large variety of items that we use in our day to day lives in fact become lost or misplaced on a day to day basis. However, among these items, loosing eyeglasses is perhaps the most troubling. That is because many people rely on their eyeglasses in order to have sufficient vision to perform even the simplest of tasks. However, when the eyeglasses become lost, the poor vision of the eyeglass owner without the benefit of the eyeglasses ironically makes it nearly impossible to locate the eyeglasses.

U.S. Pat. No. 3,390,938 to Gansz discloses a floating device which attaches over the ear pieces of a pair of eyeglasses to make the eyeglasses buoyant. Gansz is perhaps helpful in preventing a person from loosing their eyeglasses around the water, but is not useful to help a person from loosing their eyeglasses during everyday use.

U.S. Pat. No. 4,086,004 to Scrivo et al. discloses a pair of eyeglasses which have built in fiber optic members which are capable of transmitting light in the viewing area of the eyeglass frame. However, this light source is not switchable to selectively illuminate to allow the owner to find the eyeglasses when the owner looses the eyeglasses.

While these units may be suitable for the particular purpose employed, or for general use, they would not be as suitable for the purposes of the present invention as disclosed hereafter.

SUMMARY OF THE INVENTION

It is an object of the invention to produce an eyeglass locator system which helps an eyeglass owner find a pair of eyeglasses when they becomes lost. Accordingly, a portion of the eyeglasses illuminate once enabled to help the owner to visually and audibly locate the eyeglasses.

It is another object of the invention to produce an eyeglass locator system which is usable with any pair of eyeglasses. Accordingly, by one embodiment, a pair of slip-on ear piece covers are mountable upon the ear pieces of any existing pair of eyeglasses to provide the locating functions according to the present invention therewith.

It is another object of the invention to provide an eyeglass locator system which is inexpensive to manufacture and simple to install.

The invention is an eyeglass locator system for locating misplaced eyeglasses having a frame and a pair of earpieces extending rearwardly from the frame, comprising a transmitter and a receiver portion. The transmitter is preferably keychain attachable, and produces a radio frequency signal when activated by means of a button. The receiver portion is located at the eyeglasses and produces and audible and/or visual alert in response to the radio frequency signal. The receiver portion is preferably either encapsulated within one or both of the earpieces at its distal end, or is located in a sleeve which is mounted over the distal end of one or more of the earpieces of an existing pair of eyeglasses.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
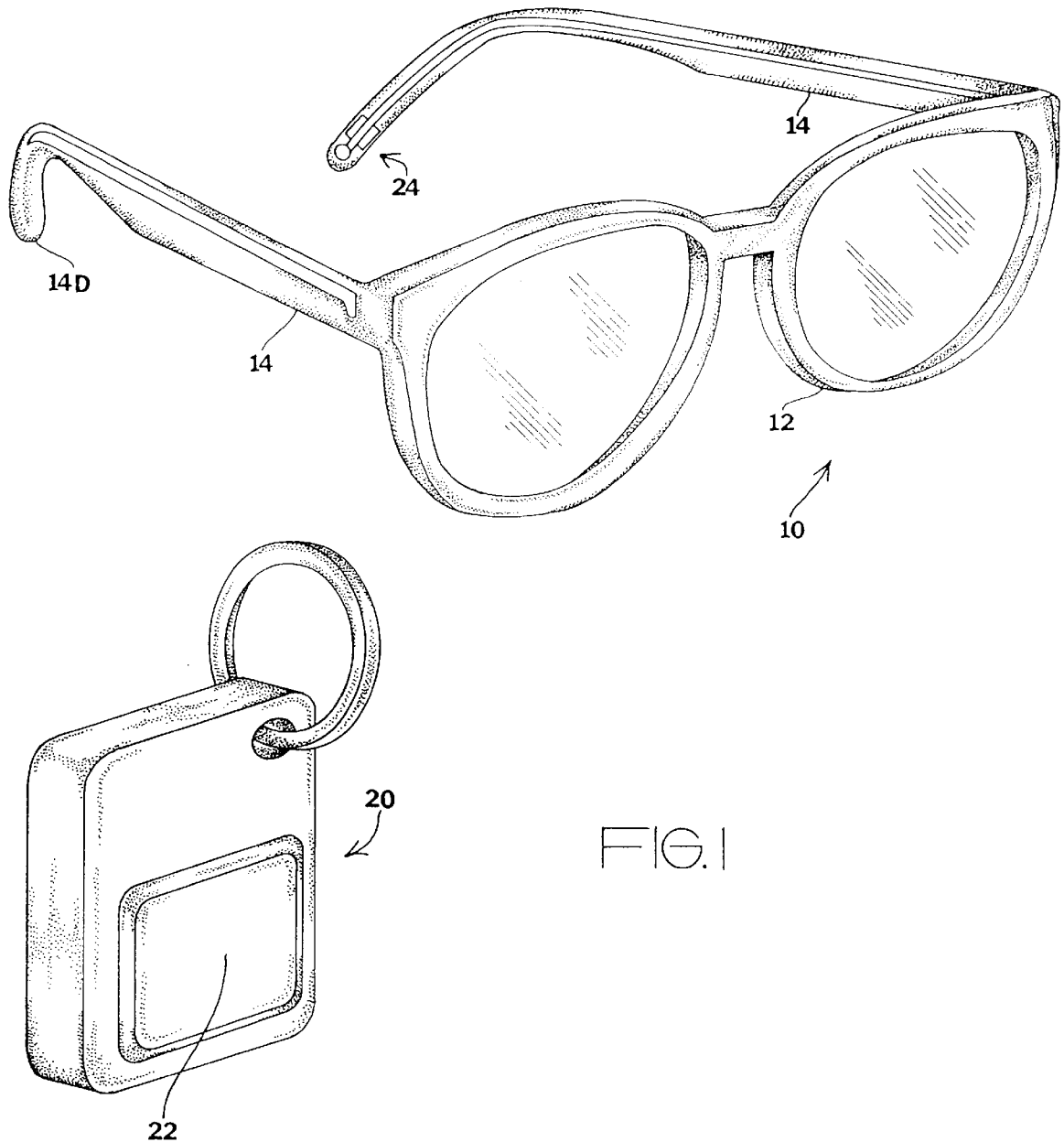
FIG. 1 is a diagrammatic perspective view, illustrating a pair of eyeglasses having a receiver portion of the invention incorporated therein, and illustrating a keychain transmitter for activating the receiver portion of the invention.

FIG. 1 illustrates a pair of eyeglasses 10. The eyeglasses 10 have a frame 12 and a pair of earpieces 14 extending rearwardly from the frame 12. The earpieces have a distal end 14D which is fully opposite the frame 12.

An eyeglass locator system comprises a keychain transmitter 20 which has an activation button 22 and produces a radio frequency signal when the activation button 22 is pressed. The eyeglass locator system also comprises a receiver portion 24 which is located at the eyeglasses 10. The receiver portion 24 produces an audible and/or visual alert in response to the radio frequency signal produced by the transmitter 20.

Figure 2:
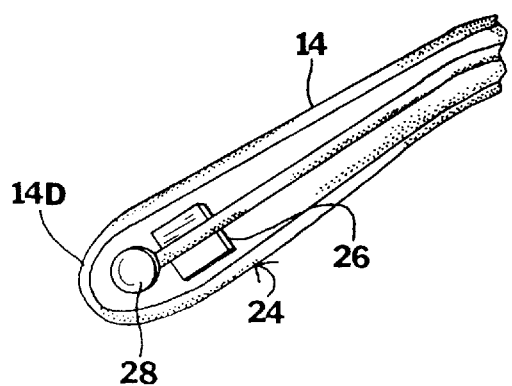
FIG. 2 is an enlarged perspective view, illustrating the receiver portion incorporated within one of the earpieces.

FIG. 2 is an enlargement of the distal end 14D of one of the earpieces. Generally, the earpieces 14 are made of a hard, transparent plastic. The receiver portion 24 is encapsulated within the earpiece 14. The receiver portion 24 includes a beeper receiver device 26, which is a solid-state device that is capable of receiving the radio frequency signal and producing an audible alert in response thereto. The beeper receiver device 26 also incorporates a battery or other suitable power source. An illumination device 28, such as a light bulb or LED is also incorporated within the receiver portion 24, and is connected to the beeper receiver device 26 for producing an illumination alert in response to the radio frequency signal being received by the beeper receiver device 26.

Figure 3:
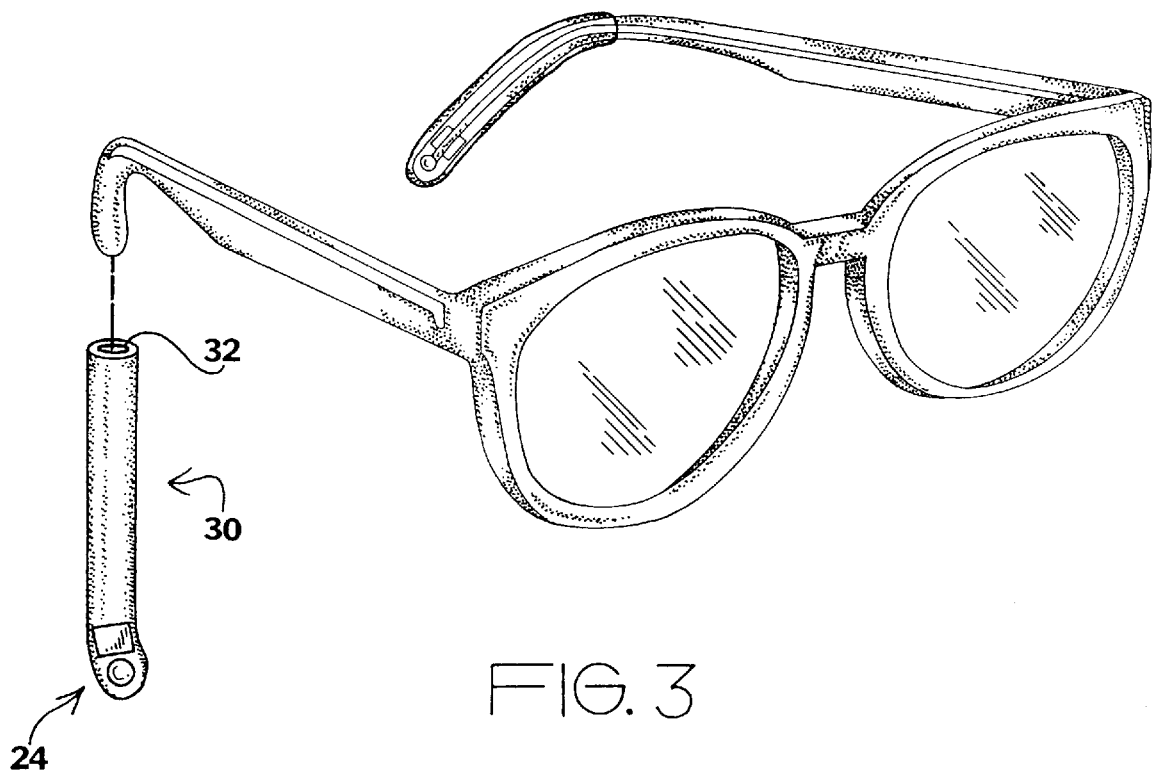
FIG. 3 is an assembly view, illustrating the receiver portion of the invention incorporated within a sleeve, wherein the sleeve may be slipped onto one of the earpieces of an existing pair of eyeglasses.

FIG. 3 illustrates an alternate embodiment of the eyeglass locator system, further comprising a sleeve 30, wherein the receiver portion 24 is located within the sleeve 30. The sleeve 30 itself is made of clear plastic, and has the receiver portion 24 encapsulated therein. The sleeve 30 has a bore 32 which is slightly resilient, so that it can slip over the earpiece 14 of a pair of existing eyeglasses which do not already contain the eyeglass locator system.

In conclusion, herein is presented an eyeglass locator system, which has a transmitter for producing a radio frequency signal, and has a receiver portion which is located at a pair of eyeglasses for producing an audible and/or visual alert in response to the radio frequency signal, to aid a person in locating their eyeglasses.

What is claimed is:

1. An eyeglass locator system, for locating a pair of eyeglasses having a frame and a pair of earpieces extending rearward from the frame, comprising:

a transmitter, for producing a radio frequency signal; and
   a receiver portion located at the eyeglasses, for producing an audible and visual alert in response to the radio frequency signal to allow the eyeglasses to be located.

2. The eyeglass locator system as recited in claim 1, wherein the receiver portion is located at the earpieces.

3. The eyeglass locator system as recited in claim 2, wherein the earpieces each have a distal end, and wherein the receiver portion is encapsulated in at least one of the earpieces at the distal end thereof.

4. The eyeglass locator system as recited in claim 3, wherein the transmitter further comprises a keychain attachable transmitter having a transmitter button which enables the radio frequency signal to be produced.

5. The eyeglass locator system as recited in claim 1, wherein the earpieces each have a distal end, and further comprising a sleeve having a bore for extending over the distal end of one of the earpieces, the receiver portion is encapsulated the sleeve.

6. The eyeglass locator system as recited in claim 5, wherein the transmitter further comprises a keychain attachable transmitter having a transmitter button which enables the radio frequency signal to be produced.

7. An eyeglass locator method, for locating a pair of eyeglasses having a receiver portion mounted at said eyeglasses and a transmitter, comprising the steps of:

producing a radio frequency signal from the transmitter;

receiving the radio frequency signal at the receiver portion; and producing an audible and visual alert from the receiver portion at the eyeglasses.

8. The eyeglass locator method as recited in claim 7, wherein the eyeglasses have a frame and earpieces extending rearward from the frame, and wherein the receiver portion is located at the earpieces.

9. The eyeglass locator method as recited in claim 8, wherein the earpieces each have a distal end, and further using a sleeve having a bore, wherein the receiver portion is encapsulated within the sleeve, and wherein the method steps as recited are preceded by inserting one of the earpieces into the bore.

10. The eyeglass locator method as recited in claim 8, wherein the receiver portion is encapsulated within one of the earpieces.

\* \* \* \* \*